United States Patent [19]

Norton

[11] 4,415,116

[45] Nov. 15, 1983

[54] SOLDERING TOOL WITH RESILIENT HOLD-DOWN ATTACHMENT AND METHOD OF USING SAME

[75] Inventor: W. Jack Norton, Kittanning, Pa.

[73] Assignee: PPG Industries, Inc., Pittsburgh, Pa.

[21] Appl. No.: 290,631

[22] Filed: Aug. 6, 1981

[51] Int. Cl.³ .......................... B23K 3/02; H05B 3/06; B23K 31/02

[52] U.S. Cl. ................. 228/180 A; 228/212; 228/51; 219/230

[58] Field of Search ...................... 228/51, 52, 53, 57, 228/44.1 A, 6 A, 180 A, 212; 219/230, 85 D

[56] References Cited

U.S. PATENT DOCUMENTS

| 3,403,242 | 9/1968 | Cropp | 219/85 D |
|---|---|---|---|
| 3,467,818 | 9/1969 | Ballentine | 219/522 |
| 3,480,759 | 11/1969 | Sachs et al. | 210/242 |
| 3,558,854 | 1/1971 | Siegel | 219/233 |
| 3,632,973 | 1/1972 | O'Keefe | 219/230 |
| 3,673,664 | 7/1972 | Niese | 29/203 P |
| 3,685,714 | 8/1972 | Moyer et al. | 228/6 |
| 3,706,871 | 12/1972 | Witherow et al. | 219/242 |
| 3,940,046 | 2/1976 | Fern | 228/8 |

Primary Examiner—Kenneth J. Ramsey
Assistant Examiner—Marc Hodak
Attorney, Agent, or Firm—Edward I. Mates

[57] ABSTRACT

A soldering tool with a resilient hold-down attachment is described together with a manner of using the tool or a plurality of such tools to solder a braided lead wire to a bus bar fused to a glass substrate. Such tools are used to make heated backlights for automobiles.

8 Claims, 9 Drawing Figures

SOLDERING TOOL WITH RESILIENT HOLD-DOWN ATTACHMENT AND METHOD OF USING SAME

BACKGROUND OF THE INVENTION

1. Field of the Invention

The present invention relates to soldering tools, particularly those useful for attaching braided lead wires to ceramic metal bus bars on a substrate. A frequent use for the present invention is the solder connection of a lead wire comprising a tinned copper braid to each of a pair of bus bars of ceramic silver composition. The solder connections between tinned copper lead wires to ceramic silver bus bars are used in heated rear windows for automobiles (popularly termed backlights) to provide good electrical connection between a heated circuit interconnecting the pair of bus bars and a voltage source to which the lead wire is adapted for connection. Good electrical connections require a plurality of solder connections at spaced positions along the length of each bus bar so as to minimize the total resistance of the heating circuit and bus bar system for the heated backlight.

In the past, lead wires have been attached to bus bars by applying hand clamps over a lead wire portion applied to an edge portion of a glass sheet to clamp the lead wire to the glass sheet beyond each end of a bus bar to secure the lead wire to the substrate along an edge portion thereof that contains a bus bar. A plurality of solder application points are marked along each bus bar with a flux, and solder is applied by holding a wire of solder at each of the fluxed areas in turn starting from the clamped end of the bus bar and gradually soldering each fluxed area by applying the tip of a soldering tool to a solder wire in each fluxed area in turn to form a pool of solder in the fluxed area. Since it is necessary for the solder to cool into the solid state before a secure bond is made between the lead wire and the bus bar, it is necessary for the operator to remove the soldering tool from the pool of solder. The viscosity of the solder may cause the solder to lift the lead wire and thus lift the lead wire with the soldering tool. This sometimes destroys the solder connection entirely.

It is awkward, if not impossible, for an operator to remove the soldering tool from the vicinity of the fluxed area and still keep the lead wire in alignment with the portion of the bus bar to which it is soldered at any fluxed area. This difficulty has been met by applying additional clamping means at an engagement point on the downstream side of each successive fluxed area in the direction of successive solder application points. However, it would be desirable for an operator to be able to maintain the lead copper braid wire in proper alignment at each solder application point during the time that the pool of solder is being formed from the solder wire and also during the time that the pool is being cooled to a temperature at which a strong bond is obtained between the lead wire and the bus bar without requiring the movement of clamping means in advance of the path of successive solder application points.

A pull test of 25 pounds must be passed before the lead wire-to-bus bar connection is acceptable by customer standards. Hence, the amount of solder that forms a pool and hardens at each solder application point must be sufficient to enable the heated backlight to pass the pull test.

2. Description of Patents of Interest

U.S. Pat. No. 3,467,818 to Ballentine discloses an electrically heated backlight with a pair of bus bars having spaced connections to a pair of lead wires, one providing electrical connection to ground and the other providing electrical connection to a 12 volt electrical system of an automobile. The need for a strong bond between the lead wire and the bus bar is discussed in this patent. The solder connections are spaced from one another and the lead wire extends loosely between solder connections over the entire length of the bus bar to which it is bonded by solder. The reason for extending the lead wires loosely between the spaced solder connections is to compensate for any difference in thermal expansion between each lead wire and its aligned bus bar that results from changes in temperature of the window during its use, particularly when current is applied to the heating circuit interconnecting the bus bars to heat a window that is either fogged or iced.

Unless the lead wire is held in proper alignment with the ceramic silver bus bar of the heated backlight of the automobile during the melting of the solder wire to form a pool of solder and during the time that the pool of solder cools to form a solid spot of solder, the solder connection may be either weakened or broken entirely. Under such circumstances, the solder connections will fail to pass the pull test.

U.S. Pat. No. 3,480,759 to Sachs et al shows a soldering tool pivotally supported from a relatively massive stand. The massive stand is difficult to move from one solder application point to another and is not suggested as a hold-down to secure workpieces together during soldering.

U.S. Pat. No. 3,558,854 to Siegel et al discloses a miniature soldering gun mounted in movable relation to a pencil-type grip by a movable spring-biased electrical connector assembly inside the pencil grip. This apparatus does not include any hold-down device for the workpieces.

U.S. Pat. No. 3,706,871 to Witherow et al also discloses a self-supporting soldering tool pivotally mounted on a base. The base of this device is too massive to suggest its use as a movable hold-down for workpieces.

U.S. Pat. No. 3,673,664 to Niese discloses a solder application point locating device that comprises a removable clip that holds a lead wire against a bus bar and has a plurality of apertures that coincide with solder application points along the length of the device. The device holds the lead wire against the bus bar to guide the locations for applying solder through the apertures. The separate device must be removed after the solder hardens. The device operates entirely independently of the soldering apparatus and it would be beneficial to the backlight soldering art to avoid the use of such a device.

U.S. Pat. No. 3,685,714 to Moyer et al discloses apparatus to solder flexible, braided lead wires to strip electrodes fused to a backlight. This apparatus includes conveyor means to automatically locate the backlights relative to special soldering equipment and is characterized by complicated control circuitry and mechanisms to coordinate glass sheet positioning with the application of solder. Such mechanical equipment requires maintenance and it would be convenient to avoid the need for such complicated equipment.

U.S. Pat. No. 3,940,046 to Fern discloses apparatus that automatically applies molten solder to connect a wire tab to wire elements that form a windshield antenna and to periodically remove excess solder from the soldering iron tip. Such apparatus is not suitable for use in making heated backlights.

SUMMARY OF THE INVENTION

The present invention provides a simple tool for applying solder by hand to connect a lead wire to a bus bar at a solder application point by forming a pool of solder at said point. The tool comprises a pair of resiliently supported hold-down means that engage the lead wire against said bus bar at engagement points that flank the solder application point when the tool is disengaged from said pool of solder.

A specific embodiment of soldering tool conforming to this invention comprises a handle, a housing extending axially beyond the handle, a soldering iron carried by the housing and having a soldering tip remote from the housing. A resilient hold-down means compising a pair of legs (each having a toe) flanking the soldering tip is resiliently secured to the housing. The legs and the resilient securing means are constructed and arranged so that the toes are normally below the soldering tip when the resilient securing means is unstressed to hold the soldering tip in spaced relation above the solder application point while the toes engage the lead wire against the bus bar at engagement points on opposite sides of the solder application point. The resilient securing means can be flexed to lower the soldering tip into contact with the solder application point while the toes hold down the lead wire against the bus bar. After the solder forms a molten pool at the solder application point, the toes continue to hold the lead wire in place against the bus bar on opposite sides of the solder application point even when the soldering tip is disengaged from said solder application point for sufficient time for the pool of solder to harden.

In this manner it is unnecessary for the operator to use another clamp or other hold-down device to secure the lead wire to the bus bar while the pool of solder is hardening. The hardened pool of solder is of sufficient size and makes sufficient contact with both the lead wire and the bus bar to enable the solder connections to pass the pull test.

The present invention will be better understood in the light of the following description of a specific embodiment of a soldering tool having a holder attachment that assures the application of pools of solder at spaced points along the interface between a braided copper lead wire and a ceramic silver bus bar and permits the alignment to be retained while each pool of solder hardens so as to insure the maintenance of optimum electrical connection between the lead wire and the bus bar before the next solder connection is started.

BRIEF DESCRIPTION OF THE DRAWINGS

In the drawings that form part of the description of an illustrative embodiment of this invention and wherein like reference numbers refer to like structural elements.

DESCRIPTION OF THE PREFERRED EMBODIMENT

Figure 1:
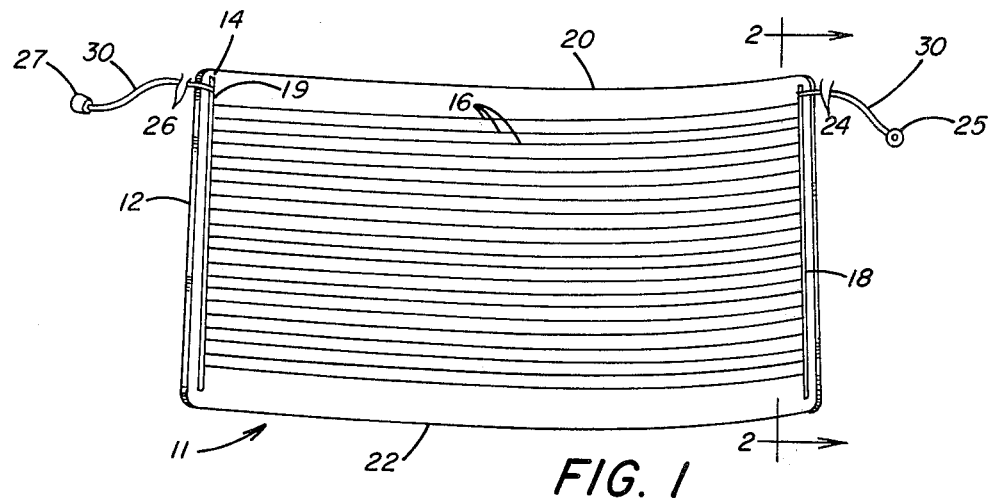
FIG. 1 is a view facing an automobile backlight that incorporates a heating element comprising a heating circuit whose bus bars are attached to lead wires using a soldering tool comforming to the present invention.

This invention can be used to make solder connection for a curved automobile backlight 11 (FIGS. 1 and 2) having an outwardly facing surface 12 and an inwardly facing surface 14. A plurality of electroconductive heating elements 16 extend in substantially equally spaced relation between a pair of bus bars 18 and 19. The latter extend substantially parallel and adjacent to the opposite end edges of the backlight.

The electroconductive heating elements 16 and the bus bars 18 and 19 of heated automobile backlights are composed of an electroconductive metal powder such as silver and a vitrifying ceramic binder. Typical ceramic electroconductive compositions include the following:

| Ingredient: | Percent by weight |
| --- | --- |
| COMPOSITION I | |
| PbO | 7.5 |
| $B_2O_3$ | 1.0 |
| $SiO_2$ | 1.5 |
| Flake silver | 70.0 |
| French fat oil | 12.5 |
| Turpentine | 7.5 |
| COMPOSITION II | |
| Finely divided silver | 72.6 |
| PbO | 9.3 |
| $SiO_2$ | 1.7 |
| $B_2O_3$ | 1.4 |
| $H_2O$ | 7.5 |
| Ethyl alcohol | 7.5 |

COMPOSITION III

A typical commerical composition is a mixture containing 90 percent by weight of a ceramic silver composition sold under the trade name AB Silver by the O'-Hommell Company of Carnegie, Pa., and 10 percent of a nonconducting mixture of metallic oxides sold under the trade name K736 Black by the Ferro Corporation of Cleveland, Ohio.

The electroconductive elements 16 form narrow lines approximately 1/32 inch (0.8 millimeters) wide and the bus bars 18 and 19 form transversely extending rows interconnecting the ends of the lines 16 in widths of ¼ inch (6 millimeters). The silver ceramic mixture is preferably applied through a stencil to form the lines 16 and the bus bars 18 and 19 by a process known as "silk "screening" to form a pattern 0.0005 inch (0.013 mm.) thick.

The particular material described has an electrical resistance of 0.35 ohm per linear inch (0.14 ohm per linear centimeter) along the electroconductive lines 16 whereas the bus bars 18 and 19 so deposited have an electrical resistance of 0.04 ohm per linear inch (0.02 ohm per linear centimeter) along their length. When the backlight to be coated with such a design is rectangular or a quadrilateral having substantially straight and parallel upper and lower longitudinal edges, the elongated electroconductive lines 16 are spaced about one inch (2.5 centimeters) apart and are parallel to one another and straight. When the upper and lower edges of the backlight are bowed or are of different configurations from one another, automotive stylists prefer the elongated electroconductive lines 16 to extend between opposed bus bars 18 and 19 in arcuate paths that gradually change in configuration from line to line, the uppermost line conforming in curvature substantially to the curvature of the upper longitudinal edge 20 of the backlight 11 and the lowest elongated electroconductive heated line conforming to the shape of its lower edge 22.

Present day automobiles have a 12 volt electric power system. The heating pattern resulting from subjecting the opposite bus bars 18 and 19 to the potential difference of 12 volts is desired to result in a substantially uniform heating pattern throughout the entire extent of the vision area of the backlight.

To protect the heating element and bus bar from excessive exposure to atmospheric conditions, the electroconductive lines 16 and bus bars 18 and 19 are all applied to the inwardly facing surface 14 of the backlight. Under such circumstances, no protective coating has been found necessary.

The electroconductive lines 16 and the bus bars 18 and 19 are applied simultaneously through the silk screening technique described previously. The coated glass sheet is then introduced into a furnace where the glass is heated to a temperature sufficient to shape the glass sheet into conformity to a mold shaping surface. During this heating, the finely divided metal ceramic frit fuses onto the glass surface 14, which develops a concave configuration during bending. When the glass bending is completed, the glass sheet is removed from the hot atmosphere and chilled as rapidly as possible to produce a tempered glass sheet. Since the elctroconductive lines 16 and the bus bars 18 and 19 have fused onto the glass surface 14 during the heating operation, they remain in the exact configuration in which they were applied to the cold glass through the stencil in the silk screening process when the glass is chilled.

A lead wire 24, having a terminal connection 25 adapted to attach the lead wire to a battery terminal, is attached to bus bar 18 using a unique soldering tool according to the teaching of the present invention. A similar lead wire 26 having a ground connecting terminal 27 is attached to bar bus 19 in a similar manner.

Preferably, the lead wire is a flat copper braid of sufficient current carrying capacity, such as the equivalent of No. 14 solid copper wire, to minimize any loss of power in the bus bars which result in heated bus bars rather than the heat being dissipated throughout the extent of the electroconductive lines 16. The free ends of the lead wires 24 and 26 are loosely laid over the attached ceramic silver bus bars 18 or 19 and attached to its adjacent bus bar by spaced solder connections 28, preferably at about 2 inch (5 centimeter) intervals. For example, a flat tin copper braid sold as Preparation No. 1231, equivalent to No. 14 AWG, made by the Alpha Wire Corporation of Elizabeth, N.J., is soldered to the ceramic silver bus bars 18 and 19 using a tin-lead-silver solder containing 70 percent by weight of lead, 27 percent of tin and 3 percent of silver, sold by the Belmont Smelting and Refining Company of Brooklyn, N.Y. as No. 5701 solder. A suitable flux for the solder is sold under the trade name Nokorode solder paste made by the M. W. Dunton Company of Providence, R.I.

The multiple attachments of the lead-in wires to each of the bus bars reduces the length of the current path through any part of the bus bar to a reasonable distance which does not cause undue loss of electrical energy to heat the bus bars. The looseness of the lead wires between their solder connections to the bus bars permits the lead wires to expand and contract thermally between the spaced solder application points 28 without unduly stressing and weakening the solder connections. The plural solder application points increase the area of contact between the lead wires 24 and 26 and the bus bars 18 and 19 to reduce the heat loss in the bus bars even further, thus enabling the heating elements 16 to provide as large a proportion of the total resistance of the heating circuit as possible. The lead wires 24 and 26 have extended portions beyond the bus bars 18 and 19 that are covered with insulation 30 to avoid loss of power to the bus bars.

In securing the lead wire 24 to bus bar 18 or the lead wire 26 to bus bar 19, a clamp 35 is provided to clamp either end of the lead wire 24 or 26 to a portion of the coated surface 14 of the backlight 11 beyond an extremity of the bus bar 18 or 19. However, for the sake of brevity, only the manner of attaching lead wire 24 to bus bar 18 will be described so as to avoid duplication of description.

The lead wire 24 is laid neatly over an upwardly facing surface of the bus bar 18. Flux is applied at spaced areas where it is intended to provide spaced solder application points 28 between the lead wire 24 and the bus bar 18.

Figures 2, 3:
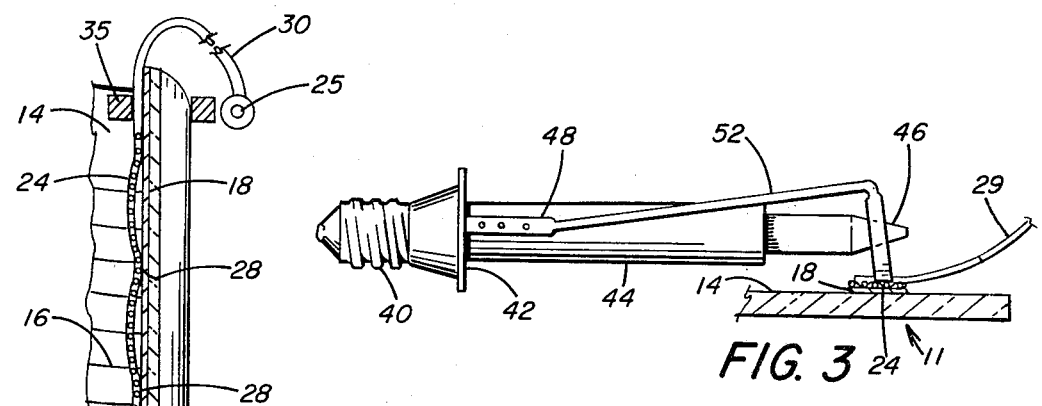
FIG. 2 is a sectional view taken along the line 2—2 of FIG. 1 showing an enlarged view of the spaced solder points bonding the lead wire to the bus bar.
FIG. 3 is a side elevational view of a soldering tool conforming to the present invention shown in a position overlying a length of solder wire at a solder application point at the beginning of a solder application step.

A special soldering tool with a resilient holder attachment is provided to solder the lead wires to the bus bars as expeditiously as possible. The modified soldering tool of the present invention comprises a handle 40 having a protective end plate or guard 42 at one end. A housing 44 is arranged to extend axially from the handle 40 beyond the plate 42. A soldering iron 46 extends axially from the end of the housing 44 that is remote from the handle 40 so that the opposite longitudinally extending walls of the housing 44 supports a pair of wire holders 48 (only one of which is shown in FIG. 3). Each wire holder is rigidly attached to the wall of the housing 44 and extends into a resilient, longitudinally and obliquely upwardly longitudinal wire portion 52 which terminates in a downwardly extending wire leg 54. Each of the wire legs terminates at its bottom portion in a reversely curved wire toe 56. An arcuately extending wire loop 58 of convex elevational configuration interconnects the reversely curved wire toes 56 at the ends of the downwardly extending wire legs. The dimensions of the wire portion 52, the downwardly extending wire legs 54, the toes 56 and the connecting wire loop 58 are such that the tip 46 of the soldering iron is encompassed by the connecting wire loop 58. The toes 56 thus serve as a pair of hold-down means adapted to engage the upwardly facing surface of a braided lead wire 24 or 26 at a pair of engagement points that flank a solder application point 28.

Figure 4:
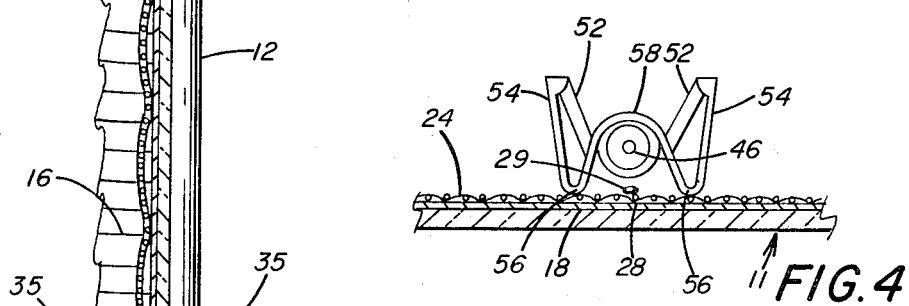
FIG. 4 is an end view of the soldering tool overlying the solder application point taken at the time of the showing in FIG. 3.

With clamps securing the ends of the lead-in wire 24 to the backlight 11, and a series of areas to be the solder connections 28 treated with flux, the soldering iron is mounted so the reversely curved wire toes 56 are disposed to engage the lead wire 24 at a pair of engagement points in flanking relation to a solder application point 28 and directly over the upwardly facing surface of the bus bar 18. A length of solder wire 29 is applied over the top surface of the lead wire 24 and the solder tool is mounted with its tip 46 in spaced relation above the solder wire 29 in the manner depicted in FIGS. 3 and 4. The soldering tip is heated electrically, either continuously or intermittently, as needed.

Figures 5, 6:
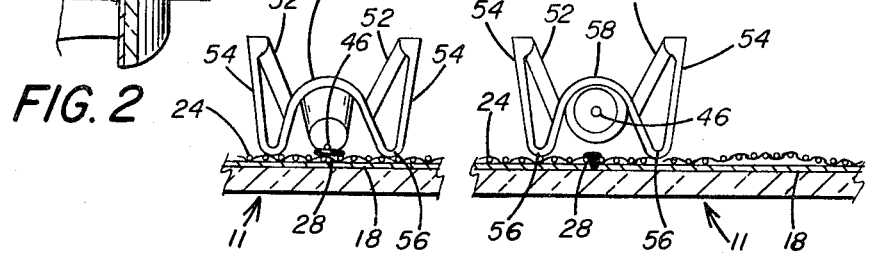
FIG. 5 is a view similar to FIG. 4 showing the relation of the soldering tip to the solder application point at an intermediate portion of the soldering cycle when the solder wire length is melted into a pool.
FIG. 6 is a view similar to FIGS. 4 and 5 taken at the end of a soldering cycle when the soldering tip is separated from the pool of molten solder and the lead-in wire and bus bars are held in alignment against one another while the pool of solder is permitted to solidify.

The operator then lowers the soldering tip 46 against the length of solder wire 29 while the soldering tip 46 is hot to form a pool of melted solder at the solder application point 28, as shown in FIG. 5. Since the lead wire 24 is a woven braid, at least a portion of the melted solder permeates through the braid and contacts the ceramic silver bus bar 18 beneath the braid. Since the lead wire 24 is mounted loosely between its clamped position against the clamp 35 and the first solder application point 28, when the hot soldering tip 46 is disengaged from the pool of molten solder, there is a chance that the viscous solder will rise with the soldering tip 46, thus weakening or breaking the solder connection between the lead wire 24 and the bus bar 18 before the solder has sufficient time to cool to form a solid electrical connection between the underlying bus bar 18 and the overlying lead wire 24. As shown in FIG. 6, the soldering tool of the present invention is so constructed and arranged that the soldering tip 46 may be raised out of contact with the pool of molten solder from the solder wire melting position depicted in FIG. 5 to a spaced position depicted in FIG. 6 with the reversely curved wire toes 56 of the resilient hold-down means maintaining the flexible lead wire 24 in physical engagement against the bus bar 18 by simultaneously continuing to apply essentially parallel downward forces at engagement points on both sides of the solder application point 28 until such time as the solder solidifies.

The soldering tool with its resilient holder attachment is then moved to the next solder application point 28 delineated by the next area containing flux, another length of solder wire 29 is inserted beneath the soldering tip 46 and over the next solder application point 28 and the process repeated at consecutive spaced solder applications points 28 for as many times as is necessary to provide the spaced solder application points 28 needed along the length of the loose interface between the lead wire 24 and the bus bar 18 to insure adequate solder connections therebetween to provide both good electrical connections and strong mechanical couplings at each of the solder applications points. A similar operation is performed with respect to lead wire 26 and bus bar 19 to provide spaced solder connections 28 along the opposite longitudinal edge of the automobile backlight 11.

When all the solder connections are completed along the length of the bus bars at the ends of the electroconductive lines at the opposite sides of the heating circuit, the backlight 11 is tested by applying the pull test to insure that the solder connections can withstand a 25 pound pull without breaking and by measuring the resistance in ohms of the heating circuit between the bus bars. If the tests are passed, the backlight is packed for shipment. The battery terminal connections 25 and the ground connecting terminal 27 of each completed backlight is taped to the major surface of the backlight for shipment in order to avoid any loose parts in the shipping package.

The benefit of the present invention is that it enables an operator to have the use of one hand for applying the solder wire to each solder application point 28 while the other hand controls the flexing of the holder attachment with respect to the soldering tool so as to have the soldering tip 46 engage and heat the solder wire 29 to form the pool of solder needed at each solder application point 28 and to release the soldering tip 46 from engagement with the pool of solder while the spaced toes 56 of the resilient hold-down means remain engaged with the lead wire against the bus bar at engagement points on opposite sides of the solder application point until such time as the solder has solidified sufficiently to insure an adequate connection. Soldering can be performed to obtain strong solder connections between the lead wires and the bus bars without requiring the use of an auxiliary clamp that must be moved for the application of solder to each solder application point.

While this description has been made with respect to a manually operated soldering tool and resilient holder therefor, it is understood that the present invention is susceptible of utility with an automatic type of operation. A robot may be used to control the movement of the heated soldering tip relative to the resilient flanking hold-down means. It is also within the gist of this invention to mount a series of soldering tools in a row on a common support, each tool having a heated tip flanked by a pair of resiliently connected hold-down means to apply a series of solder connections simultaneously along the length of a bus bar. In this alternative, each toe between a pair of adjacent soldering tools may serve as a hold-down means at an engagement point flanking each of two adjacent soldering tips.

Figure 7:
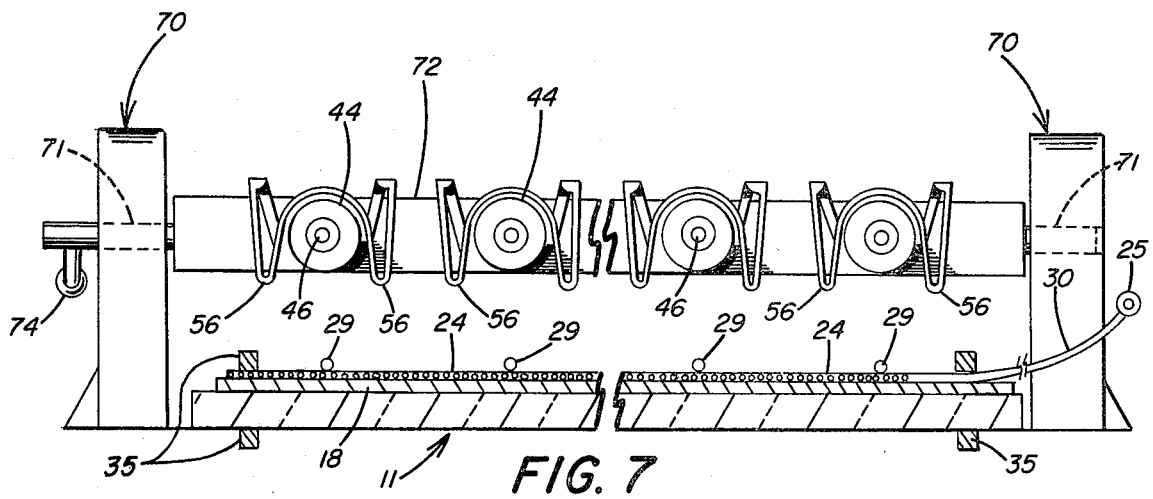
FIGS. 7, 8 and 9 are fragmentary views of an alternate embodiment of this invention taken during the performance of different steps during the operation of the alternate embodiment.
Figure 8:
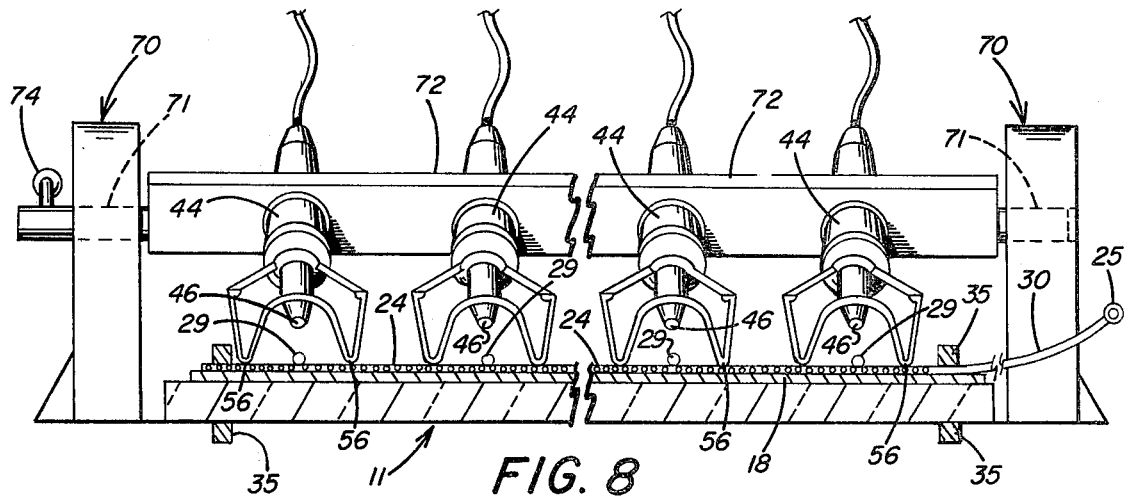
Figure 9:
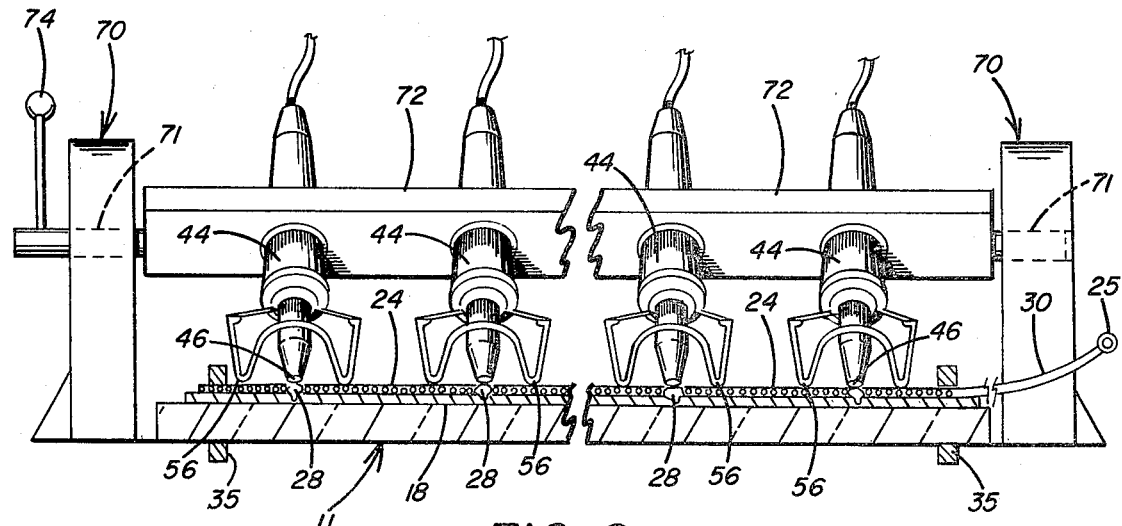

An alternative soldering apparatus for imparting a plurality of soldering joints in unison is shown in FIGS. 7, 8 and 9 of the drawings. This alternative embodiment comprises a pair of vertical brackets 70, which pivotally support a pair of stub shafts 71. A mounting member 72 is fixed at each end to the stub shafts 71 to rotate therewith in unison. A handle 74 extends radially from one of the stub shafts to pivot the mounting member 72 about an axis defined by the stub shafts 71. A plurality of soldering tools of the type depicted in FIGS. 3 to 6 is mounted along the length of the mounting member 72.

The structural elements of the plurality of soldering tools mounted along the length of the mounting member 72 are depicted by the same reference numerals applied to the individual soldering tool depicted in FIGS. 3 to 6. In FIG. 7, the mounting member 72 is pivoted to an orientation at which the soldering tool housings 44 extend parallel to one another at an angle that provides clearance for mounting a curved backlight 11 onto a solder application station within an area defined by the vertical brackets 70. Lock means (not shown) may be included to engage the handle 74 to maintain all the housings at a desired orientation that provides the desired clearance. After a length of braided lead wire 24 is applied over the length of the bus bar 18, a length of solder wire 19 and flux applied to each spot to be soldered and the portion of lead line 24 that extends to electrode 25 is clamped to the backlight 11 beyond an end of the bus bar 18 with a clamp 35, the handle 74 is unlocked and pivoted through the orientation depicted in FIG. 8, where the toes 56 clamp the lead wire 24 to the bus bar 18, to the orientation depicted in FIG. 9 so that the toes 56 clamp the lead wire 24 to the bus bar 18 on each side of the length of solder wire 29 while the soldering tips 46 melt the solder wire 29 to form pools of solder simultaneously at each soldering point. The pools of solder permeate through the thickness of the braided lead wire 24 and make electrical contact with the bus bar 18. Before the handle 74 is returned to the FIG. 7 position, it stops at the FIG. 8 position for sufficient time to allow the pools of solder to solidify while the braided lead wire 24 remains clamped to the bus bar 18 because of the continued engagement of the toes 56.

At the same time, a similar action takes place to solder braided lead wire 26 to bus bar 19 simultaneously at spaced points therealong. When both lead wires 24 and 26 are soldered to their respective bus bars 18 and 19 and the pools of solder solidified, the handles 74 are rotated to orient the solder tool housings 44 into positions permitting clearance to remove the backlight from the solder application station and to insert an additional backlight to the solder application station.

If desired, the soldering tool housings 44 may be pivotally attached to the mounting member 72 for sequential pivoting so that each solder application point may be provided with solder in sequence instead of simultaneously as shown in FIGS. 7 to 9. However, for mass production purposes, the simultaneous application of all solder points is preferred.

It also may be desirable to apply the soldering points simultaneously in groups of solder application points that are spaced apart from other solder application points in the group in order to avoid having hot spots too closely spaced during the application of solder. Under such circumstances, one or more additional groups of solder application points intermediate the solder application points of the first group are completed in sequence.

The form of invention shown and described in this disclosure represents an illustrative preferred embodiment thereof. It is understood that various changes may be made in the design of the apparatus without departing from the gist of the invention as defined in the claimed subject matter which follows.

I claim:

1. A tool for making a solder connection between a lead wire to a bus bar at a solder application point by forming a pool of solder from a length of solder wire at said solder application point comprising a housing extending axially, a soldering iron carried by said housing and having a soldering tip remote from said housing, a resilient holding member comprising a pair of legs flanking said soldering tip, a toe for each leg, and means resiliently securing said legs to said housing, said legs, toes and said resiliently securing means being constructed and arranged so that said toes are normally below said soldering tip when said resiliently securing means is unstressed to hold said soldering tip in a position in spaced relation above said solder application point while said toes engage the upper surface of said lead wire against said bus bar at engagement points on opposite sides of said solder application point, said resiliently securing means being adapted to be flexed to lower said soldering tip into contact with a length of solder wire at said solder application point while said toes continue to hold down said lead wire against said bus bar at said engagement points when said solder tip applies heat to said solder application point and continues to hold said lead wire in place against said bus bar at said engagement points.

2. A tool as in claim 1, wherein said resilient hold-down means comprises a wire holder comprising a pair of resiliently deformable longitudinal wire portions, each attached at its inner end to said housing and extending obliquely upward from said housing in flanking relation to said housing and terminating adjacent said soldering tip in flanking relation thereto, one or the other of said legs extending downward from the outer end of each said resiliently deformable longitudinal wire portions, and one of said toes at the end of each leg remote from said associated resiliently deformable longitudinal wire portion adapted to hold said lead wire against said bus bar at one or the other said engagement points while permitting movement of said soldering tip relative to said solder application point between said solder application point when said resiliently deformable longitudinal wire portions are deformed and said position in spaced relation above said solder application point said soldering tip occupies when said deformable longitudinal wire portions are not deformed.

3. A tool as in claim 2, further including an arcuate member of convex elevational configuration interconnecting said toes and arching transversely over said soldering iron to permit freedom of movement of said soldering tip between said toes above said solder application point.

4. A tool as in claim 1, further including a handle and a guard at the end of said handle adjacent said housing to protect an operator from contact with said soldering tip when the latter is hot during the use of said tool to form said solder connection.

5. A tool as in claim 1, further including a frame for supporting a plurality of additional soldering tools of the type recited in claim 1 for simultaneously making a plurality of solder connections at spaced solder application points and at least one toe resiliently mounted with respect to each of said soldering tools in said row to provide hold-down means at engagement points flanking each of said solder application points.

6. A method of soldering a braided lead wire to an elongated bus bar fused to a glass substrate comprising applying at least a portion of said braided lead wire over said elongated bus bar to overlie said bus bar along its length, applying a length of solder wire to the upper surface of said braided lead wire at a solder application point, applying a soldering tool having a heated soldering tip and a pair of hold-down means resiliently supported in flanking relation to said soldering tip so that said heated soldering tip engages said length of solder wire while said pair of hold-down means engage said braided lead wire at a pair of engagement points flanking said solder application point to melt said length of solder wire and form a liquid pool of solder, a portion of which permeates the braided lead wire and makes electrical contact through the braided lead wire with said bus bar, lifting said heated soldering tip from said liquid pool of solder while maintaining said hold-down means in engagement with said engagement points until said pool of liquid solder that has permeated through said braided lead wire and contacted said bus bar cools sufficiently to form a solid solder connection between said braided lead wire and said bus bar, and removing said soldering tool including said hold-down means from said engagement at said solder application point and said pair of engagement points.

7. A method as in claim 6, further including repeating said soldering method by applying a second length of solder wire to the upper surface of said braided lead wire at a second solder application point spaced from said first-mentioned solder application point where said braided lead wire is aligned over said bus bar, applying said heated soldering tip to engage said second length of solder wire while said pair of hold-down means engage said braided lead wire at a second pair of engagement points flanking said second solder application point to melt said second length of solder wire and form a second liquid pool of solder at said second solder application point, at least a portion of which permeates the braided lead wire and makes electrical contact through the braided lead wire with said bus bar, lifting said heated soldering tip from said second liquid pool of solder while maintaining said hold-down means in engagement with said second pair of engagement points until said second pool of solder has cooled sufficiently to form a solid solder connection between said braided lead wire and said bus bar at said second solder application point and between said second pair of flanking engagement points, followed by repeating said soldering method at a plurality of solder application points spaced along the length of said bus bar.

8. A method as in claim 6, wherein said method is used simultaneously at a plurality of solder application points longitudinally spaced along the length of said bus bar by applying a unique length of solder wire to the upper surface of said braided lead wire at each of said spaced solder application points, applying a soldering tool having a heated soldering tip and a pair of hold-down means flexibly supported in flanking relation to said soldering tip so that a different soldering tip engages a different one of said lengths of solder wire while said pairs of hold-down means engage said braided lead wire at a pair of engagement points flanking each of said solder application points to melt said lengths of solder wire and form liquid pools of solder, at least a portion of each of which permeates the braided lead wire and makes electrical contact through the braided lead wire with said bus bar, lifting said heated soldering tips from said liquid pools of solder while maintaining said hold-down means in engagement with said engagement points until said pools of liquid solder cool sufficiently to form spaced, solid, solder connections between said braided lead wire and said bus bar.

* * * * *